United States Patent [19]
Stöber

[11] Patent Number: 4,466,303
[45] Date of Patent: Aug. 21, 1984

[54] INFINITELY VARIABLE FRICTION-CONE TRANSMISSION WITH MOVABLE FLANGE-MOUNTED MOTOR

[75] Inventor: Bernd Stöber, Pforzheim, Fed. Rep. of Germany

[73] Assignee: Gebr. Stöber, Pforzheim, Fed. Rep. of Germany

[21] Appl. No.: 348,253

[22] Filed: Feb. 12, 1982

Related U.S. Application Data

[63] Continuation-in-part of Ser. No. 084,417, Oct. 12, 1979, abandoned.

[30] Foreign Application Priority Data

Oct. 12, 1978 [DE] Fed. Rep. of Germany ....... 2844414

[51] Int. Cl.³ .................... F16H 15/16; F16H 1/12; F16H 1/20; H02K 7/10
[52] U.S. Cl. .................... 74/191; 74/421 A; 310/75 C; 310/75 R; 464/158
[58] Field of Search ............ 74/191, 192, 193, 194, 74/199, 421 A; 464/159, 158; 310/75 R, 75 C, 75 D

[56] References Cited

U.S. PATENT DOCUMENTS

| | | | |
|---|---|---|---|
| 2,055,014 | 9/1936 | Manger | 464/158 |
| 2,570,493 | 10/1951 | Schmidt | 74/191 |
| 2,638,011 | 5/1953 | Smith | 464/158 |
| 2,842,001 | 7/1958 | Hunting | 74/191 |
| 2,853,860 | 9/1958 | Crankshaw | 464/159 |
| 3,388,607 | 6/1968 | Stöber et al. | 74/191 |
| 3,851,534 | 12/1974 | Stöber | 74/193 |
| 4,004,433 | 1/1977 | Calistrat | 464/159 |
| 4,116,572 | 9/1978 | Heldmann et al. | 403/344 |
| 4,175,404 | 11/1979 | Schöph | 464/158 |

FOREIGN PATENT DOCUMENTS

| | | | |
|---|---|---|---|
| 744869 | 7/1970 | Belgium | 464/158 |
| 905768 | 12/1945 | France | 74/191 |

*Primary Examiner*—Lawrence J. Staab
*Assistant Examiner*—Michael D. Bednarek
*Attorney, Agent, or Firm*—Becker & Becker, Inc.

[57] ABSTRACT

The invention relates to a transmission arrangement in which the transmission includes a friction-cone member which can be arranged with its hub on the motor shaft of a motor, whereby the end of the hub directed towards the motor includes at least one slot, and at this end of the hub there is arranged a clamping collar for clamping the hub to the motor shaft. An anti-friction bearing, arranged on the hub at the portion thereof which is closest to the friction-cone, adapted to resist radial and axial loads, and supported by a housing-flange of the motor, is radially and axially rigidly journalled in the housing-flange.

9 Claims, 4 Drawing Figures

INFINITELY VARIABLE FRICTION-CONE TRANSMISSION WITH MOVABLE FLANGE-MOUNTED MOTOR

This is a continuation-in-part of co-pending parent application Ser. No. 084,417—Stöber filed Oct. 12, 1979, now abandoned.

The present invention relates to an infinitely variable friction-cone transmission with a movable flange-mounted motor. More particularly, the present invention relates to a transmission arrangement in which the transmission includes a friction-cone member which can be arranged with its hub on the motor shaft of a motor, whereby the end of the hub directed towards the motor includes at least one slot, and at this end of the hub there is arranged a clamping collar for clamping the hub to the motor shaft. An anti-friction bearing, arranged on the hub at the portion thereof which is closest to the friction-cone, adapted to resist radial and axial loads, and supported by a housing-flange of the motor, is radially and axially rigidly journalled in the housing-flange.

In such arrangements, the motor shaft is journalled twice. Together with the anti-friction bearing on the friction-cone hub there is provided, accordingly, a statically uncertain triple bearing. The disadvantages of this arrangement are overcome, in known arrangements, in such a way that the third bearing, which is located on the hub of the friction-cone, is arranged to be adjusted as to clearances or tolerances, within limits, axially and radially. It is thus necessary to connect the friction-cone very positively to the motor shaft. This can be achieved by a press-fit of the motor shaft in the bore of the friction-cone hub and by additional clamping of that end of the friction-cone hub which is closest to the motor. It is then disadvantageous when assembling the motor and the transmission that the resistance, in conformity with the press-fit between the motor shaft and the receiving bore of the friction-cone hub, has to be overcome, whereby it is possible that the anti-friction bearing arranged on the hub of the friction-cone is axially clamped and will be prematurely incapable of carrying out its intended functions. Furthermore, the assembly becomes more difficult. In addition, the clearance deviations associated with the motor shaft are affecting the friction-cone member so that this disturbs the true running or rotation thereof, circumferentially and in a plane perpendicular to its longitudinal central axis.

It is an object of the present invention to avoid the aforementioned drawbacks and to arrange the friction-cone hub in such a way that an assembly of the motor is possible which is substantially stress-free and that an undisturbed running of the friction-cone is achieved.

These objects and other objects and advantages of the present invention will appear more clearly from the following specification in connection with the accompanying drawings, in which.

The arrangement in accordance with the present invention is characterized primarily therein that there is provided an anti-friction bearing which is arranged in such a way so as to be radially and axially substantially rigid in the housing-flange, and that the hub of the friction-cone member is connectible to the motor shaft of the motor with the end which is directed towards the motor so as to be adapted to accommodate pitching momentum acting on the friction-cone member of the friction-cone transmission, making said hub quasi-pivotal on said motor shaft. This arrangement to accommodate pitching momentum acting on the friction-cone member thus avoids the drawbacks of the triple bearing arrangement which leads to statically imprecise arrangements. The somewhat flexible, or articulated, or quasi-pivotal support or connection can also be provided in such a way that the bore of the friction-cone hub only in the interconnection region or support zone is provided with a diameter which is in conformity with the diameter of the motor shaft.

Advantageously, the bore in the friction-cone hub in the interconnecting or support zone is rounded, when viewed in longitudinal cross section. The remainder of the motor shaft does not contact the bore of the friction-cone hub. Transmission of torque is carried out, for example, by means of an adjusting spring. By providing the quasi-pivotal support towards that hub end which is closest to the motor, there is achieved that the friction-cone member is supported closely adjacent to the motor journal or bearing on the flexural rigid and rotation-true part of the motor shaft. This means that the running accuracy or rotational accuracy, or operational accuracy, of the friction-cone member is enhanced.

In accordance with another embodiment of the invention, in the support zone of the friction-cone hub there can be arranged a sleeve with external teeth whereby the friction-cone hub is supported with matching internal teeth on the sleeve. The external teeth of the sleeve can also be rounded analogously to the bore in the friction-cone hub as described in connection with the preceding embodiment, with the teeth being rounded when viewed in the longitudinal cross section.

The portion or end of the friction-cone hub directed towards the motor can be provided with three radially extending slots. Upon introduction of the motor shaft into the hub, the friction-cone hub can be secured to the shaft in the support zone by means of a clamping collar which constricts the throat or diameter of the hub, which is thereby fastened or secured to the shaft, which provides for a wobble-free running of the friction-cone member. Prior to clamping of the clamping collar there is achieved an unhindered assembly of the motor, which is furthermore not producing any stresses detrimentally affecting the anti-friction bearing provided on the friction-cone hub.

Figure 1:
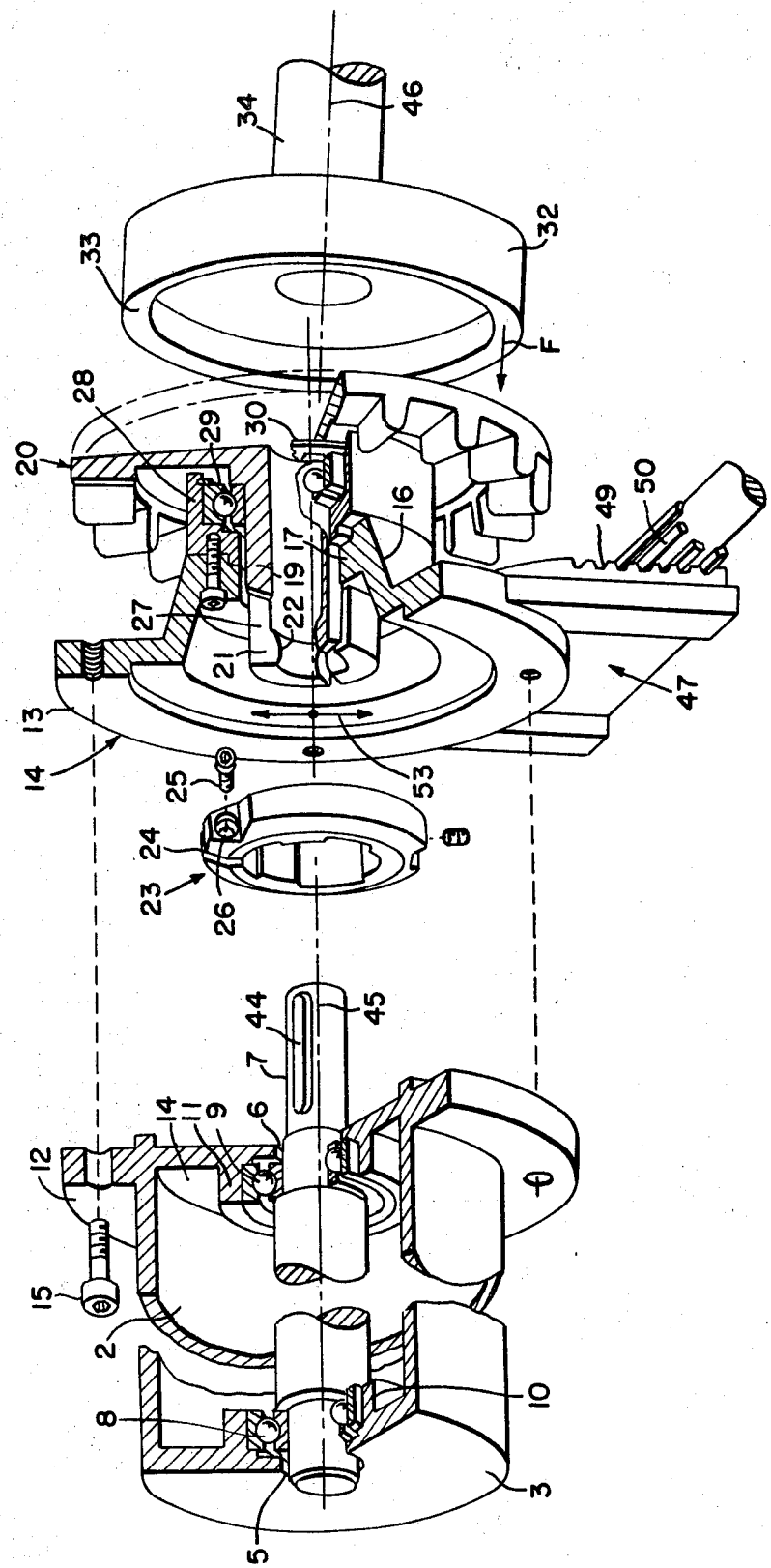
FIG. 1 is an exploded view in a perspective illustration of parts and partially in section for a first embodiment of a friction-cone transmission arrangement in accordance with the present invention.
Figure 2:
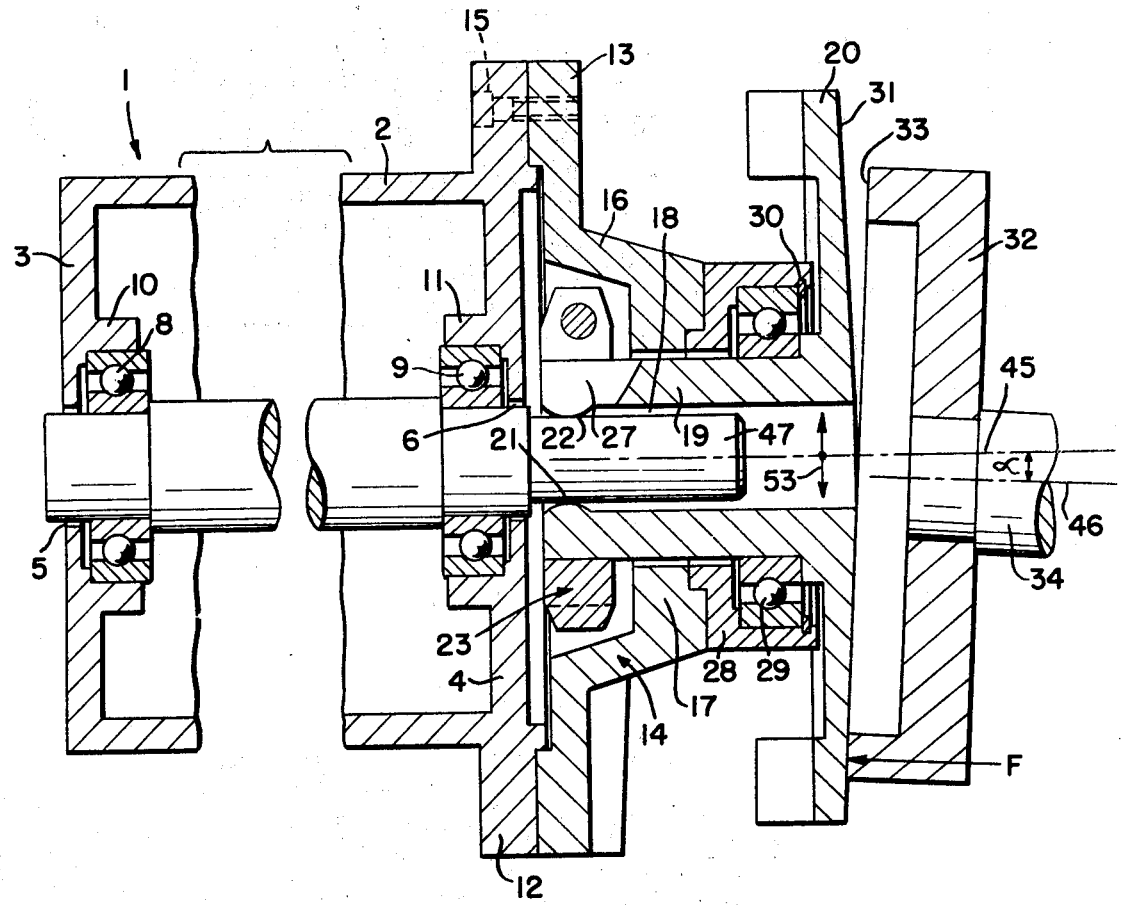
FIG. 2 is an enlarged illustration of a diagrammatic cross-sectional view of an arrangement of a friction-cone transmission arrangement in accordance with the present invention.
Figure 3:
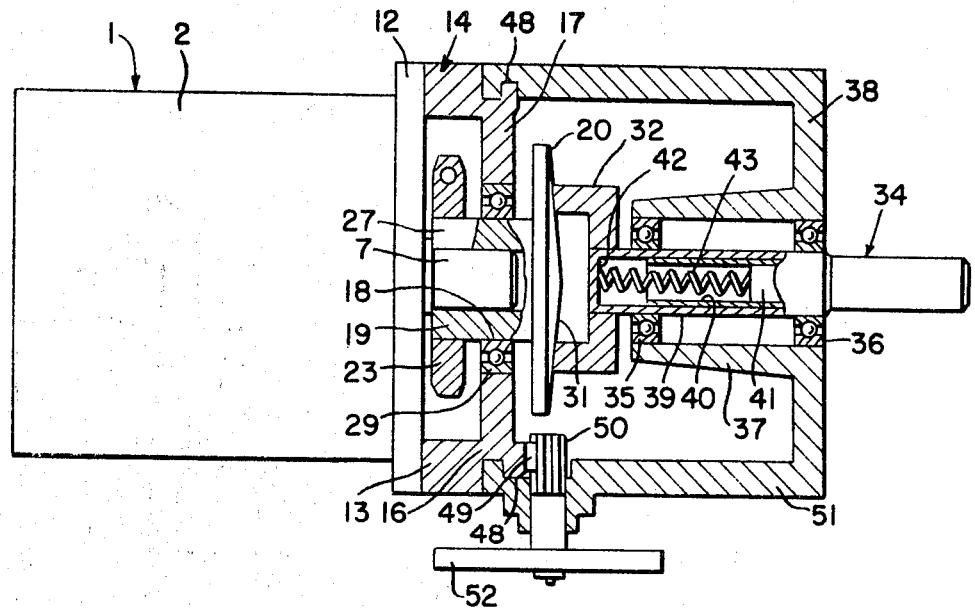
FIG. 3 is a plan view and partially sectioned illustration of the friction-cone transmission arrangement according to FIG. 1.

Referring now to the drawings in detail, the friction-cone transmission arrangement according to FIGS. 1 through 3 inclusive has a motor 1 which has a cylindrical housing 2 that is provided with front plates or end walls 3, 4 at both ends. The end walls 3, 4 respectively have a through-passage opening 5, 6 for a motor shaft 7 which is rotatably journalled or mounted in the motor housing 2 via two ball bearings 8, 9 located with spacing from each other. The motor shaft 7 is made strengthened or reinforced in diameter in a range between both ball bearings 8, 9 so that the motor shaft 7 is secured against axial shifting or displacement in the motor housing 2. A ring 10, 11 which engages against the outer raceway of the ball bearing and which surrounds the ball bearing is provided projecting vertically or at right angles to the end wall into the housing and located at the end walls 3, 4 under consideration concentrically of the through-passage openings, 5, 6 belonging or associated therewith for holding of the ball bearings 8, 9.

The motor housing 2 has a flange or damping collar 12 with which the motor housing 2 engages against a flange 13 of a housing part 14 and being connected releaseably therewith for example by means of screws 15. The housing part 14 has a truncated-cone-shaped housing body 16 which extends opposite to the motor housing 2 and the greatest outer diameter of which is smaller than the outer diameter of the flange 13. The housing body 16 also can be made cylindrical as shown in FIG. 3.

The motor shaft 7 projects through the through-passage opening 6 of the motor housing 2 into the housing part 14. The housing body 16 is provided with an end wall 17 at the end thereof away from the motor housing 2 and this end wall 17 provides a through-passage opening 18 for a hub 19 of a friction cone 20. The friction cone 20 is located on the side of the housing part 14 opposite the housing 2 and projects with a hub 19 thereof into the housing part 14. The inner diameter of the hub 19 is nominally greater than the outer diameter of the motor shaft 7 with reference to FIG. 2. The hub 19 is seated on the motor shaft 7 only at the free end thereof. The hub 19 at the free end thereof is provided with a rotary or circulating elevation 21 projecting inwardly of which the outer side 22 is curved or bent concave in cross section in relation to the axis of the hub 19 according to FIG. 2. In this way the hub elevation 21 is made crowned or spherical in part or with a cambered roll whereby the hub elevation 21 can be supported approximately jointed or articulated upon the motor shaft 7. A clamping ring 23 is provided for fastening the hub 19 upon the motor shaft 7 and this clamping ring 23 is divided at 24 according FIG. 1. The clamping ring 23 is rigidly clamped on the hub 19 of the friction cone 20 by means of a screw 25 which is inserted through openings 26 in the ends of the clamping ring limiting or defining the slot 24 and the clamping ring is fixed on the hub by means of a nut. The clamping ring 23 is arranged on the hub in the region of the elevation 21 as shown in FIG. 2 so that the hub 19 is rigidly clamped on the motor shaft 7 with the crowned or spherically embodied elevation. The hub 19 is spaced from the motor shaft 7 in the region outside the elevation 21.

The hub 19 is provided with slots 27 which extend from the free hub end further as far as to substantially in the height or level of the end wall 17 of the housing part 14 to increase the clamping effect. The slots 27 also pass through the elevation 21 according to FIGS. 1 and 2. The clamping ring 23 is located or lies within the housing part 14 with spacing from the end wall 17 and from the housing body 16. The clamping ring 23 additionally is also spaced from the face or end wall 4 of the motor housing 2 which terminates or ends the housing part 14 on the side toward the motor 1.

A sleeve or socket-shaped bearing part 28 is preferably releaseably fastened on the side away from the motor 1 upon the face or end wall 17 of the housing parts 14. The sleeve of socket-shaped bearing part 28 serves for receiving a roller bearing 29, preferably a ball bearing, with which the hub 19 is rotatably supported. The roller bearing 29 is fastened by means of a spring or snap ring 30 which is seated in a groove in the inner wall of the bearing part 28, fastened axially unshiftable in the bearing part. The outer diameter of the essentially cylindrical bearing part 28 corresponds to the outer diameter of the housing body 16 in the region of the face or end wall 17.

The roller bearing 29 also can be installed or accommodated in the face or end wall 17 of the housing part 14 as shown by FIG. 3. The roller bearing with this embodiment is seated or located in the throughpassage opening 18 of the end wall 17.

The friction cone 20 has a conical surface 31 against which a cylindrical raceway 32 engages with the ring-shaped face or end surface 33 thereof lying in a plane. The raceway 32 is seated or located upon a transmission shaft 34 which is rotatably supported by means of two roller bearings 35, 36 in a sleeve or socket-shaped support bearing 37 of a housing 38. The support bearing 37 is made unitary or in one piece with the housing 38 and lies or is located within the housing. The drive shaft 34 projects from the housing 38. Succeeding spur-gear-, bevel-gear- or worm-gear drive or transmission means can be driven with the drive shaft 34.

The gear or tranmission shaft 34 is made in two parts and consists of two telescopic-type arranged shaft parts 39 and 40. The inner shaft part 40 has a projecting cam 41 upon which the outer shaft part 39 is seated or mounted. A pressure or compression spring 43 extends between the end surface of the inner shaft part 40 and an end surface 42 of the outer shaft part 39. The raceway 32 is rigidly or torsionally connected with the outer shaft part 39. The engagement or contact pressure between the friction cone 20 and the raceway 32 is generated load dependent by means of a coupling formed by the cam 41 corresponding to the torque taken off at the gear or transmission shaft 34. The pressure of compression spring 43 arranged between the raceway 32 and the transmission shaft 34 maintains a nominal contact pressure between both parts during idling, accordingly under unloaded condition.

The housing 38, the housing part 14 and flange 12 of the motor housing 2 form a closed housing in which the clamping ring 23, the friction cone 20 and the raceway 32 are installed or accommodated. The friction cone 20 is rotatably driven with the motor shaft 7. Since the raceway 32 with the end surface 33 thereof engages upon the conical surface 31 of the friction cone 20, the raceway 32 and the transmission shaft 34 are rotatably driven therewith. The motor shaft 7 is provided with an adjusting spring 44 of FIG. 1 for torque transfer and the adjusting spring 44 engages in a corresponding guide of the friction-cone hub 19. Since the hub 19 engages or is supported upon the motor shaft 7 with the elevation 21 closely adjacent to the end wall 4 of the motor housing 2 there is attained that the friction cone 20 can engage or support upon a bending-resistant or flexurally stiff accurately rotating or revolving part of the motor shaft 7. The running accuracy of the friction cone 20 is considerably increased thereby.

The axes or axles 45 and 46 of the motor shaft 7 and the transmission shaft 34 form a nominal or small angle $\alpha$ with each other. Thereby the raceway 32 no longer engages with its entire end surface 33 against the conical surface 31 of the friction cone 20 as clearly recognizable in FIG. 2. A tilting or tipping force F is exerted upon the friction cone 20 thereby which can be received or taken up with certainty and reliably in a safe manner as a consequence of the articulated journalling or mounting of the friction-cone hub 19 upon the motor shaft 7.

As a consequence of the two-part embodiment or construction of the transmission shaft 34, the contact force or engaging pressure between the friction cone 20 and the raceway 32 can be controlled or regulated dependent upon load. When the torque to be transferred is great, a relative rotation, twisting or torsion occurs or arises between the outer and the inner shaft parts 39, 40. Since the outer shaft part 39 is shiftable in an axially limited manner, there is attained via the tapered cam 40 during the relative rotation, twisting or torsion that the outer shaft part 39 is shifted axially in a direction toward the friction cone 20. The contact force or engaging pressure between the friction cone 20 and the raceway 32 is increased thereby so that the friction cone 20 can rotate the raceway 32 satisfactorily also with an increased or elevated torque.

The housing part 14 with the motor housing 2 flanged thereon is shiftable transverse to the axis 45 of the motor shaft 7 in relation to the raceway 32 in order to be able to change or vary the speed of the transmission shaft 34. The housing part 14 for this purpose has a slide part 47 of FIG. 1 which engages against oppositely located sides in a slide or carriage guide 48, 48' of the housing 38 according to FIG. 3. The slide of carriage part 47 is provided with a tooth means 49 on one side in the manner of a toothed rack, spur rack or gear rack in which a pinion or bevel gear 50 engages which is rotatably journalled or mounted in a wall 51 of the housing 38. The pinion or bevel gear 50 can be rotated with a regulator or set wheel 52 located externally of the housing 38, whereby the housing part 14 with the motor housing 2 flanged or connected therewith can be pushed or shifted relative to the housing 38 transverse to the axis 45 of the motor shaft 7 in the direction of the double arrow 53 in FIGS. 1 and 2.

The friction cone 20 is shifted thereby relative to the raceway 32. The spacing of the engagement surface of the raceway 32 on the conical surface 31 from the axis 45 of the motor shaft 7 determines the speed ratio or relationship between the motor shaft 7 and the transmission shaft 34. The speed ratio or relationship can be infinitely varied or changed in a stepless manner with the pinion or bevel gear or driver 50. An electrical speed adjustment by means of the pinion or bevel gear or driver 50 can be provided in place of the manual speed adjustment or variation for example by means of the regulator or set wheel 52.

Figure 4:
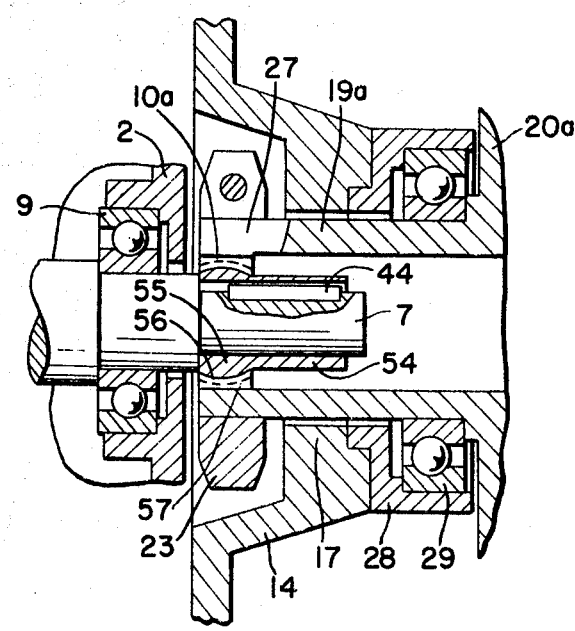
FIG. 4 is an axial section of a second embodiment of a bearing or mounting of a friction-cone transmission arrangement according to the present invention in a view similar to that of FIG. 2.

Only the engagement or support of the friction-cone hub 19 on the motor shaft 7 is embodied differently with the embodiment according to FIG. 4 than with the previously described embodiment. Otherwise this friction cone transmission or drive is embodied or made identically as with the embodiment according to FIGS. 1 through 3 inclusive. A sleeve or bushing 54 is seated torsionally on the motor shaft 7 and this sleeve or bushing 54 provides a rotary or circulating elevation 55 made spherical or crowned in cross section on the outer side thereof. The elevation 55 is provided with outer teeth 56 in which an inner tooth means 57 of the friction-cone hub 19 engages or meshes. A torsionally secure connection is assured thereby between the friction-cone hub 19 and the motor shaft 7. The clamping ring 23 is seated or mounted on the hub 19 in the region of the teeth or tooth means 56, 57 and this clamping ring 23 torsionally connects the hub 19 with the motor shaft 7 in the manner described in the foregoing paragraphs. A jointed or articulated engagement or supporting of the friction-cone hub 19 on the motor shaft 7 is assured as a consequence of the crowned or spherically embodied configuration of the teeth or tooth means 56, 57 also with this embodiment.

In FIG. 2 there is illustrated a motor shaft 7 of a motor 1 as well as a friction cone 20 that can be shifted in the direction of the double arrow 53 in FIGS. 1 and 2. The motor shaft 7 is journalled twice, only by bearing 8, and once by bearing 9, and, furthermore, by the anti-friction bearing 29 which is adapted to accommodate or resist radial and axial loads. The bearing 29 is rigidly arranged in a housing-flange comprising the motor slide member 14 of the motor 1 and bearing housing 28. The friction-cone or friction-cone member 20 is supported with its friction-cone hub 19 in a quasi-pivotal manner on the motor shaft 7 to accommodate the pitching momentum indicated by arrow F. In accordance with FIG. 2, the bore in the hub 19 is provided in the support zone 22 only with a diameter which corresponds to the outer diameter of the motor shaft 7 at this location, whereby the bore of the hub 19 is rounded when viewed in the longitudinal cross section indicated in FIG. 2.

According to the embodiment shown in FIG. 4, in the support zone 10a of the friction-cone hub 19a, a sleeve 55 is secured on the shaft 7 with a suitable tolerance. The sleeve 55 includes a plurality of external gear teeth 56 which are rounded in the longitudinal direction in a manner analogous to the rounding of the hub bore as indicated in FIG. 2. The hub 19a of the friction-cone member 20a in this embodiment, in turn, is provided with internal gear teeth 57 which are adapted to operatively engage the external gear teeth 56 of sleeve 55.

The hub 19 or the hub 19a of the friction-cone member is clamped in the support zone 22 or 10a to the motor shaft 7 by a clamping ring or clamping collar 23. Three radially directed slots 11 are provided in the part or end of the hub 19 which is closest to the motor 1.

The manner of functioning of the present inventive infinitely variable friction-cone transmission is set forth once again in the following paragraphs for clarification purposes.

The friction-cone or friction-cone member 20 is driven by the motor shaft 7 and the friction-cone 20 is mounted rotationally secure upon the motor shaft 7 by means of the friction-cone hub 19. The raceway or ball race illustrated at the right in FIG. 2 engages against the friction-cone 20 and this raceway is seated or mounted rotationally secure upon the likewise recognizable output shaft and the raceway is rotatably driven by the friction-cone member 20. The motor 1 with the motor shaft 7 and with the friction-cone 20 can be shifted in the direction of a double arrow 53 illustrated in FIGS. 1 and 2 whereby the engagement location between the friction-cone and the raceway is changed radially. Consequently, the speed of the output shaft can be changed.

The foregoing description of the manner of functioning is clearly apparent. Also in the description there is apparent that the motor shaft 7 is rotatably driven by the motor 1. Since the friction-cone 20 is seated or mounted rotationally secure upon the motor shaft 7 by way of the friction-cone hub 19 and the tensioning or clamping ring 23, there is noted that also the friction-cone 20 is positively driven correspondingly. With a friction-cone drive or transission there is self understood that a raceway engages against the friction-cone 20 as also clearly illustrated in FIG. 2 of the drawings of the present case. Furthermore, there is mention made of a stepless adjustable or infinitely variable friction-cone transmission. Furthermore, there is set forth that the motor 1 is shiftable. Accordingly, however, the shifting capability of the friction-cone 20 is disclosed. Also the double arrow 53 in FIGS. 1 and 2 shows clearly that the friction-cone 20 can be shifted by way of the shiftable motor 1 vertically or at right angles to the axis of the motor shaft 7. From such disclosure there is apparent, however, positively what consequently the speed of the drive shaft is changed or varied.

Variable speed transmissions generally have a control system that operates according to the friction wheel principle; this power transmission is effected by means of dry friction between the friction cone on the motor shaft and the friction ring on the axially movable part of a dual transmission shaft.

The contact pressure between the friction cone and the friction ring is generated in relation to the load by means of a cam or coupling arrangement, in accordance with the torque transferred by the driven shaft. A spring between the friction ring and the driven shaft maintains a slight contact pressure between the friction parts during idle (no load) running, which makes it possible to adjust the speed during idle running—a significant advantage over other control systems.

The speed of the drive shaft is adjusted by moving the motor along a toothed rack guide by means of the toothed control shaft, which allows an adjustable speed ratio of approximately 1:5.

As to friction-ring wear, the combination of materials used for the friction ring and friction cone was developed in durability tests. The friction ring is the wearing part; the simple design of the variable speed transmission permits replacement of the friction ring within a few minutes without the help of a trained mechanic.

By using spur, bevel, or worm gears, it is possible to obtain practically any speed of the driven shaft. The spur gears are equipped with low-noise, crown-shaped helical gears. All gears and drive shafts are casehardened. The worm gears are equipped with heavy-duty matching gears.

The normal transmission ratio is 1:5. It may be increased considerably by using pole-changeable motors, as well as by combining the variable speed transmission with change-over gears. Reference can be made to English prospectus material belonging to the assignee of the present invention for the foregoing data.

The present invention is, of course, in no way restricted to the specific disclosure of the specification and drawings, but also encompasses any modifications within the scope of the appended claims.

What is claimed is:

1. A transmission arrangement, comprising:
   a motor having a housing-flange and a motor shaft;
   an infinitely variable friction-cone transmission having a friction-cone member including a hollow hub mounted on said motor shaft;
   an anti-friction bearing adapted to resist rigidly any radially and axially directed loads and in operative contact with said hub and said housing-flange at that end of said hub remote from said motor; and
   means for connecting to said motor shaft in an articulated manner to that end of said hub which is closest to said motor in such a way so as to avoid triple mounting the motor shaft journally and to accommodate and equalize pitching momentum including tilting or tipping forces acting on said friction-cone member, making said hub quasi-pivotal on said motor shaft and also making possible transmittal of any axial and radial forces encountered during operation of said infinitely variable friction-cone transmission into said housing flange thereby to relieve and unburden said motor shaft.

2. A transmission arrangement according to claim 1, wherein said means for connecting includes at least one projection on said hub at said end closest to said motor to provide a support zone dimensioned in conformity with the diameter of said motor shaft and in operative contact therewith.

3. A transmission arrangement according to claim 2, wherein said at least one projection is rounded at said support zone as viewed in longitudinal cross section.

4. A transmission arrangement according to claim 1, wherein said means for connecting includes a sleeve operatively connectible to said motor shaft at said end of said hub closest to said motor.

5. A transmission arrangement according to claim 4, wherein said sleeve includes a plurality of external gear teeth, and said hub includes a plurality of internal gear teeth that operatively engage said plurality of external gear teeth of said sleeve.

6. A transmission arrangement according to claim 5, wherein said plurality of external gear teeth of said sleeve are rounded as viewed in longitudinal cross section.

7. A transmission arrangement according to claim 1, wherein that end of said hub closest to said motor includes at least one slot, and said means for connecting includes a clamping collar operatively arranged on a slotted end of said hub for securing said hub to said motor shaft.

8. A transmission arrangement according to claim 7, wherein said clamping collar is arranged engageable in the vicinity of said hub.

9. A transmission arrangement according to claim 7, wherein said hub includes three radially extending slots.

* * * * *